United States Patent
Jeong (10) Patent No.: US 11,724,681 B2
(45) Date of Patent: Aug. 15, 2023

(54) 3-WAY SOLENOID VALVE AND BRAKE SYSTEM FOR VEHICLE INCLUDING SAME

(71) Applicant: HYUNDAI MOBIS CO., LTD., Seoul (KR)

(72) Inventor: Seung Hwan Jeong, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 256 days.

(21) Appl. No.: 17/163,835

(22) Filed: Feb. 1, 2021

(65) Prior Publication Data

US 2022/0212649 A1 Jul. 7, 2022

(30) Foreign Application Priority Data

Jan. 5, 2021 (KR) ................ 10-2021-0000805

(51) Int. Cl.
| | |
|---|---|
| B60T 15/02 | (2006.01) |
| B60T 13/68 | (2006.01) |
| F16K 11/22 | (2006.01) |
| F16K 31/06 | (2006.01) |
| F16K 11/24 | (2006.01) |
| B60T 8/36 | (2006.01) |
| B60T 13/14 | (2006.01) |

(52) U.S. Cl.
CPC .......... *B60T 15/028* (2013.01); *B60T 8/3635* (2013.01); *B60T 8/3645* (2013.01); *B60T 13/686* (2013.01); *F16K 11/22* (2013.01); *F16K 11/24* (2013.01); *F16K 31/0637* (2013.01); *F16K 31/0679* (2013.01); *B60T 13/148* (2013.01)

(58) Field of Classification Search
CPC ...... B60T 8/366; B60T 8/3635; B60T 8/3645; B60T 8/364; B60T 15/025; B60T 15/028; B60T 13/68; B60T 13/686; F16K 11/22; F16K 11/24; F16K 31/0679; F16K 31/0637; F16K 31/0624; F16K 31/0603; F02M 25/0836; F02M 25/0845
USPC ......................................... 251/129.09, 129.1
See application file for complete search history.

(56) References Cited

U.S. PATENT DOCUMENTS

| | | | | |
|---|---|---|---|---|
| 3,417,784 A | * | 12/1968 | Cowan ................. | F16K 31/0679 137/625.65 |
| 4,361,309 A | * | 11/1982 | Sogabe ............... | F16K 31/0679 251/129.08 |
| 4,624,282 A | * | 11/1986 | Fargo .................. | F16K 31/0679 251/129.21 |
| 4,860,794 A | * | 8/1989 | Parrott .................. | B60T 8/3645 303/119.2 |

(Continued)

FOREIGN PATENT DOCUMENTS

| | | | | |
|---|---|---|---|---|
| DE | 102010016558 A1 | * | 10/2011 | ......... F16K 31/0679 |
| JP | 2001059581 A | * | 3/2001 | ............ F16K 31/06 |

(Continued)

OTHER PUBLICATIONS

Translation WO 2012126751 A1. (Year: 2012).*
Korean Office Action dated Jun. 3, 2022, for Korean Patent Application No. 10-2021-0000805.

*Primary Examiner* — Thomas J Williams
(74) *Attorney, Agent, or Firm* — H.C. Park & Associates, PLC (57) ABSTRACT

A 3-way solenoid valve and a brake system for vehicle including same. The 3-way solenoid valve includes a valve chamber, valve block, a first operation assembly, a valve seat, and a second operation assembly.

19 Claims, 6 Drawing Sheets

(56) References Cited

U.S. PATENT DOCUMENTS

| | | | | |
|---|---|---|---|---|
| 8,622,048 | B2* | 1/2014 | Young | F02M 25/089 |
| | | | | 123/518 |
| 2018/0334153 | A1* | 11/2018 | Kuenkel | B60T 13/686 |
| 2019/0291706 | A1* | 9/2019 | Kam | B60T 1/10 |
| 2022/0212649 | A1* | 7/2022 | Jeong | F16K 31/0679 |

FOREIGN PATENT DOCUMENTS

| | | | | |
|---|---|---|---|---|
| KR | 10-2000-0055491 | | 9/2000 | |
| KR | 10-2018-0126363 | | 11/2018 | |
| KR | 10-2020-0065715 | | 6/2020 | |
| WO | WO-2012126751 | A1* | 9/2012 | F16K 31/0658 |

\* cited by examiner

3-WAY SOLENOID VALVE AND BRAKE SYSTEM FOR VEHICLE INCLUDING SAME

CROSS-REFERENCE TO RELATED APPLICATION

This application claims priority from and the benefit of, Korean Patent Application No. 10-2021-0000805, filed on Jan. 5, 2021, which is hereby incorporated by reference for all purposes as set forth herein in its entirety.

BACKGROUND

Field

Exemplary embodiments relate to a 3-way solenoid valve and a braking system for a vehicle including the same.

Discussion of the Background

A conventional brake system for vehicle has solenoid valves of normal open type or solenoid valves of normal close type. The solenoid valve of normal open type refers to a solenoid valve in which the flow path is normally open when no current is applied from a control unit. Meanwhile, the solenoid valve of normal close type refers to a solenoid valve in which the flow path is normally closed when no current is applied from the control unit.

Accordingly, a conventional brake system for vehicle is equipped with solenoid valves of normal open type and solenoid valves of normal close type to supply hydraulic oil received from a brake device to wheel brakes.

Figure 1:
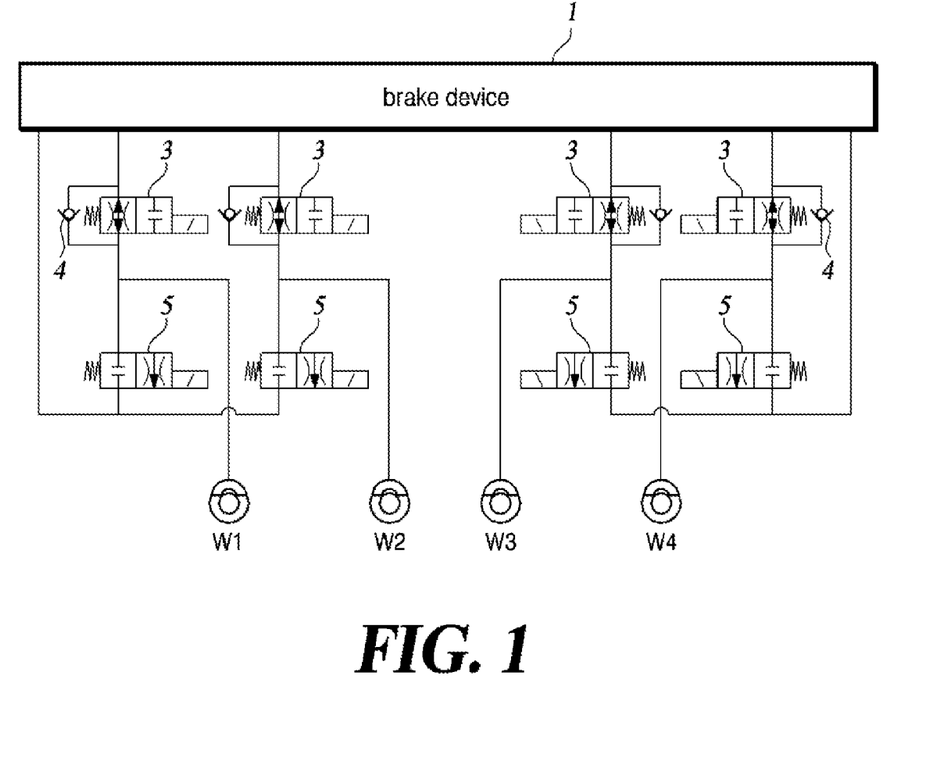
FIG. 1 is a block diagram of a brake system for vehicle according to a prior art.

FIG. 1 is a block diagram of a brake system for vehicle according to a prior art.

Referring to FIG. 1, hydraulic oil provided from a brake device 1 is supplied to an inlet valve 3 and an outlet valve 5. The inlet valve 3 is normal open type and the outlet valve 5 is normal close type. In addition, a check valve 4 that only allows a flow from a wheel cylinder W1, W2, W3 or W4 to the brake device 1 is equipped with the inlet valve 3. To reduce the hydraulic pressure supplied from the wheel cylinder W1, W2, W3 or W4, the outlet valve 5 becomes open to discharge the hydraulic oil from the wheel cylinder W1, W2, W3 or W4 to the brake device 1.

As such, the conventional brake system for vehicle must be equipped with the inlet valve 3 of normal open type, the outlet valve 5 of normal close type, and a check valve 4, so that the number of solenoid valves for implementing the brake system increases, thereby increasing manufacturing cost and increasing volume and weight of the brake system.

The above information disclosed in this Background section is only for enhancement of understanding of the background of the invention and, therefore, it may contain information that does not constitute prior art.

SUMMARY

An exemplary embodiment of the present invention provides a 3-way solenoid valve including: a valve chamber; a valve block including a first fluid port, a second fluid port, and a third fluid port, each in fluid communication with the valve chamber; a first operation assembly including a first coil, a first armature configured to generate an electromagnetic force when current is supplied to the first coil and having a hollow portion formed in a center of the first armature, a body placed on a lower portion of the first armature and formed to allow at least a portion of the first armature to pass through inside of the body, and a first elastic unit placed between the body and the first armature; a valve seat placed to block flow of fluid between the second fluid port and the third fluid port, and having a hollow portion in a center of the valve seat; and a second operation assembly including a second coil placed above the first coil, a second armature configured to generate an electromagnetic force when current is supplied to the second coil, a fluid control unit placed under a hollow portion of the valve seat to control the amount of fluid flowing to the third fluid port, and a rod placed to pass through the valve seat and the first armature while one end of the rod is in contact with the second armature and the other end of the rod is in contact with the fluid control unit.

Another exemplary embodiment of the present invention provides a brake system for vehicle including: one or more wheel cylinders configured to apply braking pressure to each wheel of the vehicle using hydraulic pressure; one or more 3-way solenoid valves configured to be placed to increase or decrease the hydraulic pressure supplied to the one or more wheel cylinders; and a brake device configured to supply hydraulic pressure to the wheel cylinder by using foot pressure applied to a brake pedal or driving a hydraulic pump, wherein the 3-way solenoid valve comprising: a valve chamber; a valve block including a first fluid port, a second fluid port, and a third fluid port, each in fluid communication with the valve chamber; a first operation assembly including a first coil, a first armature configured to generate an electromagnetic force when current is supplied to the first coil and having a hollow portion formed in a center of the first armature, a body placed on a lower portion of the first armature and formed to allow at least a portion of the first armature to pass through inside of the body, and a first elastic unit placed between the body and the first armature; a valve seat placed to block flow of fluid between the second fluid port and the third fluid port, and having a hollow portion in a center of the valve seat; and a second operation assembly including a second coil placed above the first coil, a second armature configured to generate an electromagnetic force when current is supplied to the second coil, a fluid control unit placed under a hollow portion of the valve seat to control the amount of fluid flowing to the third fluid port, and a rod placed to pass through the valve seat and the first armature while one end of the rod is in contact with the second armature and the other end of the rod is in contact with the fluid control unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

REFERENCE NUMBERS

| | |
|---|---|
| 10a: first coil | 10b: second coil |
| 20a: first armature | 20b: second armature |
| 21: rod | 22: orifice |
| 30a: first elastic unit | 30b: second elastic unit |
| 40: body | 50: sealing unit |
| 60a: first stopper | 60b: second stopper |
| 70: valve seat | 80: fluid control unit |
| 90: valve block | 110: first operation assembly |
| 120: second operation assembly | |
| 200: brake device | W1, W2, W3 or W4: wheel cylinder |
| A: first fluid port | B: second fluid port |
| C: third fluid port | P1: first flow path |
| P2: second flow path | X-Y: X-Y plane |
| Z: Z axis | |

DETAILED DESCRIPTION OF THE ILLUSTRATED EMBODIMENTS

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

The present disclosure in some embodiments seeks to reduce manufacturing cost by replacing the inlet valve and the outlet valve with the 3-way solenoid valve.

Further, the present disclosure reduces the volume and weight of the brake system for vehicle by reducing the number of solenoid valves disposed in the brake system.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), (a), (b), etc., in numbering components are used solely for the purpose of distinguishing one component from another but not to imply or suggest the substances, the order or sequence of the components. Throughout this specification, when a part "includes" or "comprises" a component, the part is meant to further include other components, not to exclude, unless there is a specific description contrary thereto.

In this specification, terms 'left' and 'right' are merely used to indicate directions in which certain components are illustrated in the drawings, and the present disclosure is not limited to the illustrated orientation and position of the components.

Figure 2:
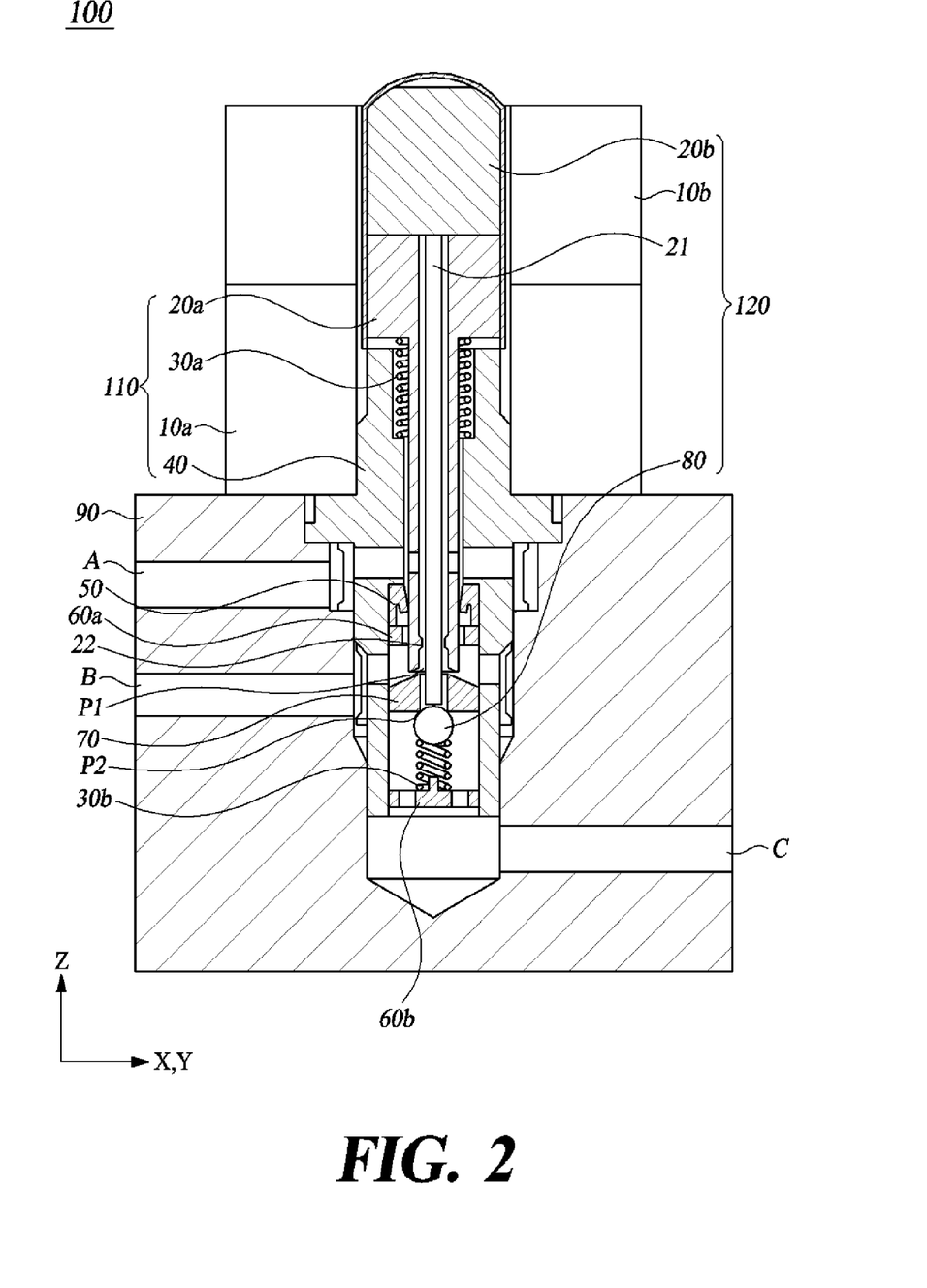
FIG. 2 is a cross-sectional view of a 3-way solenoid valve according to an embodiment of the present disclosure.

FIG. 2 is a cross-sectional view of a 3-way solenoid valve according to an embodiment of the present disclosure. In this specification, a longitudinal direction of the 3-way solenoid valve is defined as the Z axis, and a plane perpendicular to the longitudinal direction of the 3-way solenoid valve is defined as the X-Y plane. Among the directions shown in the drawing, an upper direction is defined as a 'positive Z axis' and a lower direction is defined as a 'negative Z axis'.

Referring to FIG. 2, the 3-way solenoid valve 100 comprises all or part of a valve block 90, a first operation assembly 110, a second operation assembly 120, a valve seat 70, a first stopper 60a, a second stopper 60b, a second elastic unit 30b and a sealing part 50.

The valve block 90 includes a valve chamber (not shown), a first fluid port A, a second fluid port B, and a third fluid port C. The first fluid port A, the second fluid port B, and the third fluid port C are in fluid communication with the valve chamber.

Here, the first fluid port A may be an inlet or outlet of fluid that may flow to a wheel cylinder W1, W2, W3 or W4 (refer to FIG. 6) disposed on a wheel of a vehicle. The second fluid port B may be an inlet or an outlet of fluid that may be supplied from a brake device 200 (refer to FIG. 6) according to an embodiment of the present disclosure. The third fluid port C may be an inlet or outlet of fluid that may flow in a direction toward the braking device 200 (refer to FIG. 6). However, the first to third fluid ports A, B and C are not limited to the configuration and connection described above. Fluid flowing into or out of the first to third fluid ports A, B and C flows through the valve chamber in the valve block 90.

The first operation assembly 110 includes all or part of a first coil 10a, a first armature 20a, a body 40, and a first elastic unit 30a.

The first armature 20a is configured to generate electromagnetic force when current is applied to the first coil 10a, and a hollow portion is formed in the center. The body 40 is placed under the first armature 20a, and at least a part of the first armature 20a passes through the inside of the body 40. The first elastic unit 30a is placed between the body 40 and the first armature 20a.

An orifice 22 is configured to protrude inwardly inside the hollow portion of the first armature 20a. The orifice 22 may adjust a size of a flow path according to the degree of protrusion. The orifice 22 may protrude within a range in which the flow path is not blocked between the first armature 20a and the rod 21.

The first coil 10a is disposed surrounding the outer circumferential surface of the first armature 20a, and a sleeve may be disposed between the first coil 10a and the first armature 20a.

A flow path connecting the first fluid port A and the second fluid port B is formed between the body 40 and the first armature 20a passing through the interior of the body 40. That is, since the body 40 is fixed in the valve block 90, the first elastic unit 30a pushes the first armature 20a in the positive Z-axis direction, so that an empty space is formed between the body 40 and the first armature 20a.

When current is applied to the first coil 10a, an electromagnetic force is generated in the first armature 20a, so that the gap between the first armature 20a and the body 40 may be reduced. As the amount of current applied to the first coil 10a increases, a greater electromagnetic force is generated so that the first armature 20a and the body 40 come closer to each other.

The valve seat 70 is disposed to block the flow of fluid between the second fluid port B and the third fluid port C, and has a hollow portion formed in a center of the valve seat. A rod 21 is disposed through the hollow portion of the valve seat 70, and a flow path is formed between the valve seat 70 and the rod 21.

The second operation assembly 120 includes all or part of a second coil 10b, a second armature 20b, a fluid control unit 80 and a rod 21.

The second coil 10b is disposed above the first coil 10a. The second armature 20b is configured to generate an electromagnetic force when current is applied to the second coil 10b. The fluid control unit 80 is disposed below the hollow portion of the valve seat 70 to control the amount of fluid flowing to the third fluid port C. The rod 21 is disposed so that at least a portion of the rod 21 passes through the first armature 20a and the valve seat 70, and one end contacts the second armature 20b and the other end contacts the fluid control unit 80.

The second coil 10b is disposed to surround the outer peripheral surface of the second armature 20b, and a sleeve may be disposed between the second coil 10b and the second armature 20b.

When current is applied to the second coil 10b, an electromagnetic force is generated in the second armature 20b, and the first armature 20a and the second armature 20b may be in close contact with each other by the electromagnetic force.

The rod 21 is affected by the movement of the second armature 20b. When the second armature 20b moves downward due to the electromagnetic force formed in the second armature 20b, the rod 21 also moves downward and pushes the fluid control unit 80. A second flow path P2, which is a space between the sheets 70, is formed. The second elastic unit 30b is disposed at the bottom of the fluid control unit 80, and the fluid control unit 80 is in close contact with the bottom of the hollow portion of the valve seat 70 due to the elastic force of the second elastic unit 30b.

The fluid control unit 80 may be formed in a spherical shape as shown in FIG. 2, but is not limited to the shape, and is arranged at the bottom of the hollow portion of the valve seat 70 to close the second flow path P2.

The first armature 20a may be independently driven by the first coil 10a and the second armature 20b may be independently driven by the second coil 10b. That is, when current is applied to the first coil 10a, an electromagnetic force may be formed only on the first armature 20a, and when current is applied to the second coil 10b, an electromagnetic force may be generated only on the second armature 20b. The 3-way solenoid valve 100 according to an embodiment of the present disclosure supplies current to the first coil 10a to maintain a braking pressure of the wheel cylinder W1, W2, W3, or W4, increases the braking pressure of the wheel cylinder W1, W2, W3, or W4 by supplying current to the first coil 10a and then releasing it, or supplies current to the first coil 10a and the second coil 10b to decrease the braking pressure of the wheel cylinder W1, W2, W3, or W4.

The sealing unit 50 is disposed inside the body 40, and is formed in close contact with the first armature 20a by surrounding the outer circumferential surface. Fluid may flow between the outer circumferential surface of the first armature 20a and the sealing unit 50. However, the sealing unit 50 is formed so that fluid flows only from the first fluid port A toward the second fluid port B, but that fluid does not flow from the second fluid port B to the first fluid port A. As shown in FIG. 2, the space of the sealing unit 50 is opened when the fluid flows from the first fluid port A to the second fluid port B, but does not flow in the opposite way, as the sealing unit 50 acts as a check valve. The sealing unit 50 is not limited to the shape as shown in FIG. 2. Having any shape such that fluid flows only in one-way, the sealing unit 50 according to an embodiment of the present disclosure is deemed in the range of the present invention. A first stopper 60a is disposed under the sealing part 50 to fix the sealing part 50 so as not to be separated.

Figure 3:
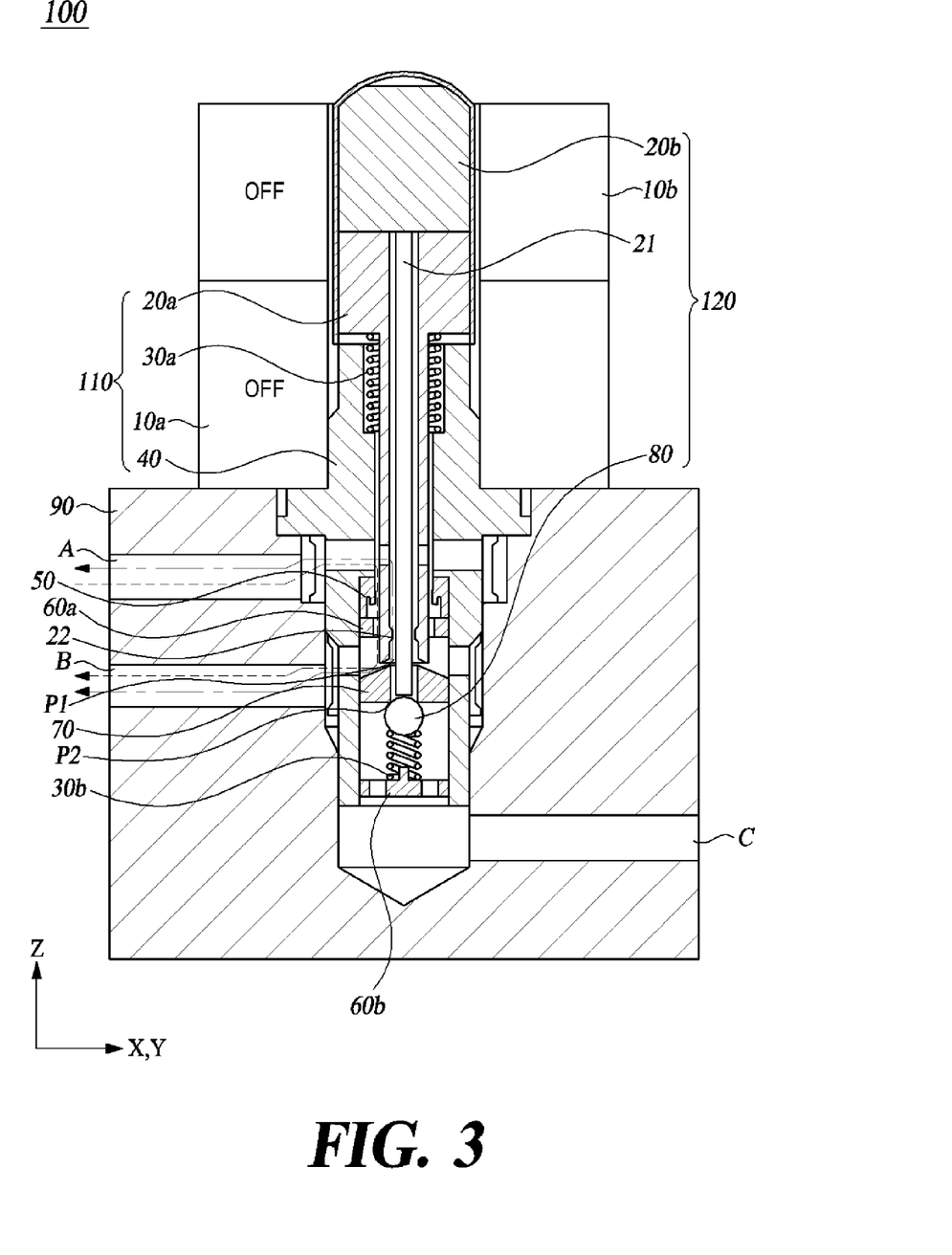
FIG. 3 is a cross-sectional view illustrating flow of fluid when no current is applied to the first coil and the second coil of the 3-way solenoid valve.

FIG. 3 is a cross-sectional view illustrating a flow of fluid when no current is applied to the first coil and the second coil of the 3-way solenoid valve.

Hereinafter, in the description of FIGS. 3 to 5, the first fluid port A is defined as a port directly or indirectly connected to the wheel cylinder W1, W2, W3 or W4, and the second fluid port B is defined as a port directly or indirectly connected to a pressurizing device (not shown) disposed in the brake device 200, and the third fluid port C is defined as a port directly or indirectly connected to a low pressure accumulator (not shown) disposed in the brake device 200. A first flow path P1 refers to a space in which the fluid flowing space between the lower end of the first armature 20a and the upper end of the valve seat 70 is opened or closed. A second flow path P2 refers to a space in which a space opened and closed through which the fluid flows between the lower end of the hollow portion of the valve seat 70 and the fluid control unit 80.

Referring to FIG. 3, since current is not applied to both the first coil 10a and the second coil 10b, the first flow path P1 between the first armature 20a and the valve seat 70 is opened, and thereby fluid between the first fluid port A and the second fluid port B flows through the hollow portion of the first armature 20a and the first flow path P1. This will be described in detail below.

When no current is applied to both the first coil 10a and the second coil 10b, electromagnetic force is not formed in the first armature 20a and the second armature 20b. Accordingly, an attractive force due to electromagnetic force is not formed between the first armature 20a, the second armature 20b and the body 40. A gap is formed between the first armature 20a and the body 40 due to the elastic force of the first elastic unit 30a. That is, the first armature 20a is moved in the positive Z-axis direction by the first elastic portion 30a to open the first flow path P1. Since the lower end of the hollow portion of the valve seat 70 is blocked by the fluid control unit 80, the second flow path P2 is not opened.

In general, in a brake system for vehicle, an inlet valve is normal open type in which a flow path is opened when no current is applied, and an outlet valve is normal close type in which a flow path is closed when no current is applied.

In the 3-way solenoid valve 100 according to an embodiment of the present disclosure, when no current is applied, the first flow path P1 disposed between the first fluid port A and the second fluid port B is opened, and the second flow path P2 disposed between the first fluid port A and the third fluid port C is closed. Accordingly, the 3-way solenoid valve 100 according to an embodiment of the present disclosure has all the features of the conventional inlet valve of normal open type and the conventional outlet valve of normal close type.

In addition, the sealing unit 50 is formed so that fluid flows only in the direction from the first fluid port A to the second fluid port, which replaces the role of a conventional check valve disposed in a conventional the inlet valve.

The process of FIG. 3 corresponds to a case where the inlet valve is opened and the outlet valve is closed in a brake system for vehicle of prior art.

Figure 4:
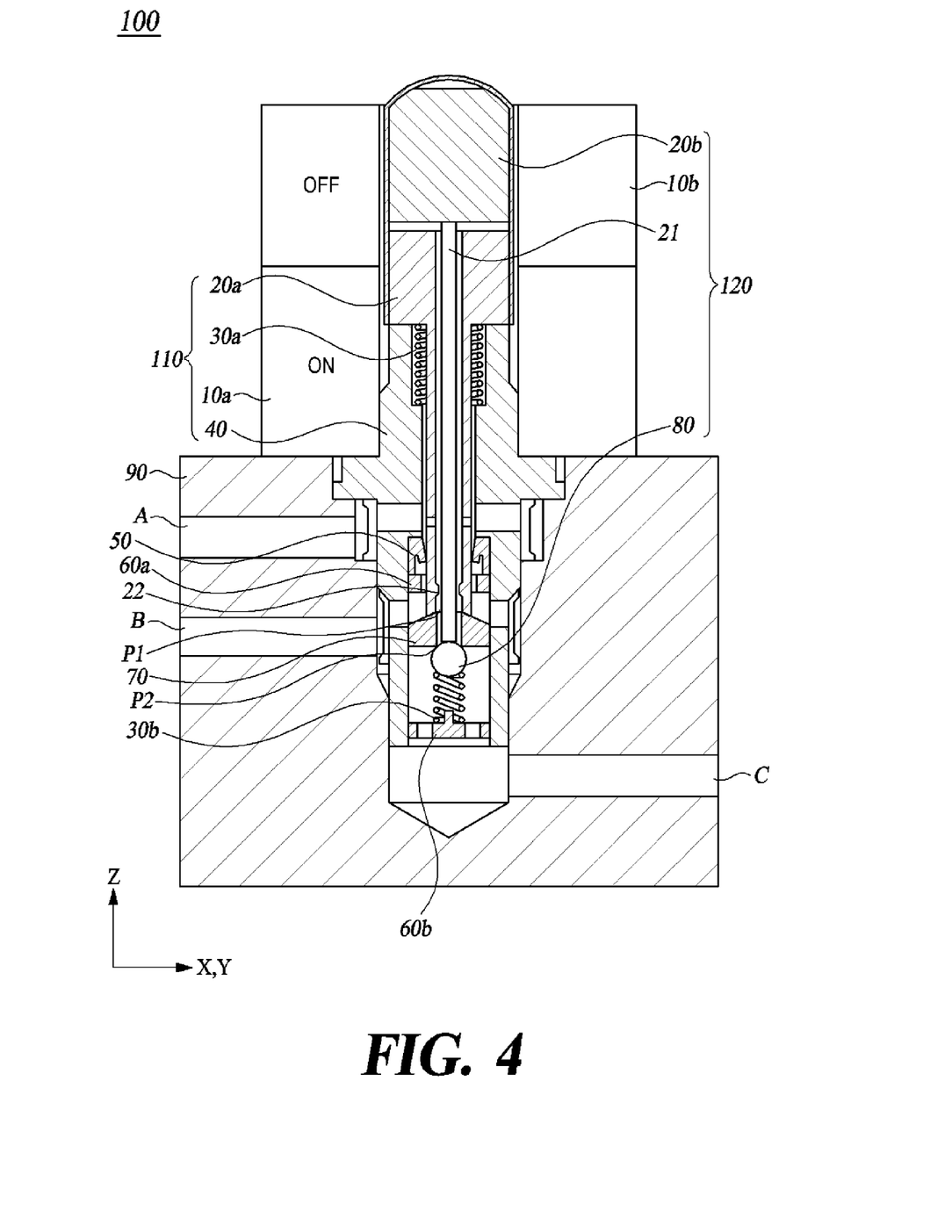
FIG. 4 is a cross-sectional view illustrating flow of fluid when current is applied to the first coil of the 3-way solenoid valve.

FIG. 4 is a cross-sectional view illustrating a flow of fluid when current is applied to the first coil of the 3-way solenoid valve.

Referring to FIG. 4, since current is applied to the first coil 10*a*, the first armature 20*a* moves toward the body 40 due to the electromagnetic force formed by the first coil 10*a* so that the amount of fluid flowing between the first fluid port A and the second fluid port B decreases or the flow path between the first fluid port A and the second fluid port B is blocked. This will be described in detail below.

When current is supplied to the first coil 10*a*, an electromagnetic force is formed in the first armature 20*a*, and an attractive force is applied between the first armature 20*a* and the body 40 due to the electromagnetic force. That is, the first armature 20*a* moves in the negative Z-axis direction. When the first armature 20*a* moves in the negative Z-axis direction, the size of the first flow path P1 decreases, and this size may be further reduced as the amount of current applied to the first coil 10*a* increases. The first flow path P1 is closed when more current is supplied to the first coil 10*a* until the lower end of the first armature 20*a* contacts the valve seat 70, and as a result, fluid can no longer flow from the second fluid port B to the first fluid port A. The second flow path P2 is also closed by the fluid control unit 80.

When the first flow path P1 and the second flow path P2 are closed, the hydraulic pressure of the pressurizing device (not shown) in the brake device 200 is generally higher than that of the wheel cylinder W1, W2, W3 or W4. Therefore, fluid does not flow through the sealing unit 50. In case where the hydraulic pressure of the pressurizing device (not shown) in the brake device 200 decreases sharply, such as when driver abruptly release a depression of a brake pedal, fluid flows from the first fluid port A to the second fluid port B by passing through the sealing unit 50 due to the difference in hydraulic pressure. That is, the sealing unit 50 can prevent a wheel-lock by rapidly reducing the hydraulic pressure in the wheel cylinder W1, W2, W3 or W4 in a situation in which the hydraulic pressure in the brake device 200 decreases rapidly.

The process of FIG. 4 corresponds to a case where both the inlet valve and the outlet valve are closed in the brake system for vehicle of the prior art. When maintaining the braking pressure applied to the wheel cylinder W1, W2, W3 or W4, the process of FIG. 4 may be applied.

Figure 5:
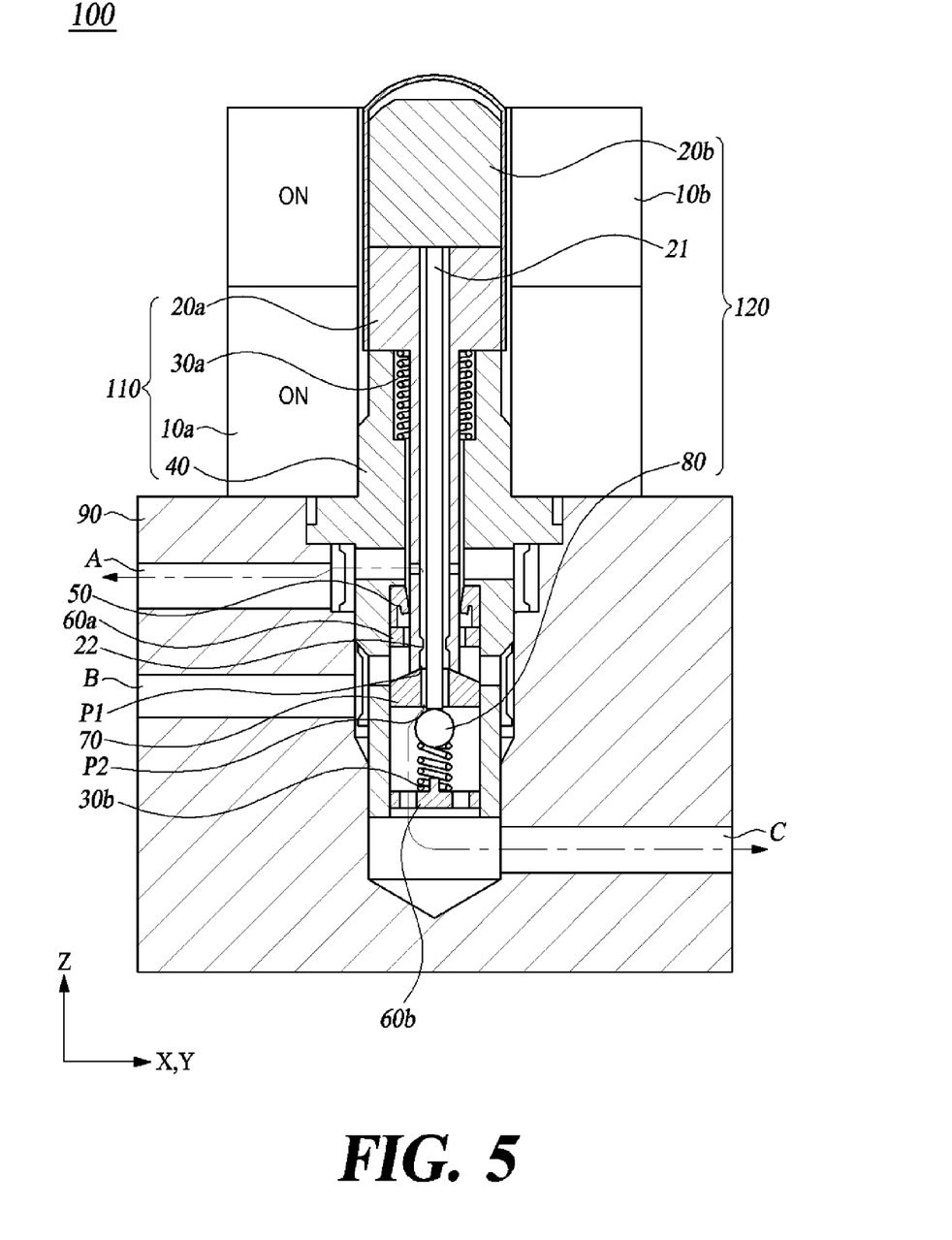
FIG. 5 is a cross-sectional view illustrating flow of fluid when current is applied to the first coil and the second coil of the 3-way solenoid valve.

FIG. 5 is a cross-sectional view illustrating a flow of fluid when current is applied to the first coil and the second coil of the 3-way solenoid valve.

Referring to FIG. 5, when current is applied to the first coil 10*a* and the second coil 10*b*, the first armature 20*a*, the second armature 20*b*, and the body 40 are in close contact with each other due to electromagnetic force. The second flow path P2 between the fluid control unit 80 and the valve seat 70 is opened so that fluid may flow between the first fluid port A and the third fluid port C. This will be described in detail below.

As current is applied to the first coil 10*a*, the first armature 20*a* moves downward to block the first flow path P1 as described in FIG. 4. The current amount applied to the first coil 10*a* should be sufficient to block the first flow path P1 by moving the first armature 20*a* as close as possible to the body unit 40 in consideration of the elastic force of the first elastic unit 30*a*. When current is applied to the second coil 10*b*, an electromagnetic force is generated in the second armature 20*b*, and the second armature 20*b* also moves downward in order to come into close contact with the first armature 20*a* that moved downward.

As the second armature 20*b* moves downward, it pushes the rod 21 in the negative Z-axis direction. The pushed rod 21 pushes the fluid control unit 80 in contact with one end of the rod 21 to thereby open the second flow path P2. Therefore, fluid may flow between the first fluid port A and the third fluid port C. The process of FIG. 5 may correspond to the case where the inlet valve is closed and the outlet valve is opened in the brake system for vehicle of prior art. When reducing the braking pressure supplied to the wheel cylinder W1, W2, W3 or W4, the process of FIG. 5 may be applied.

Figure 6:
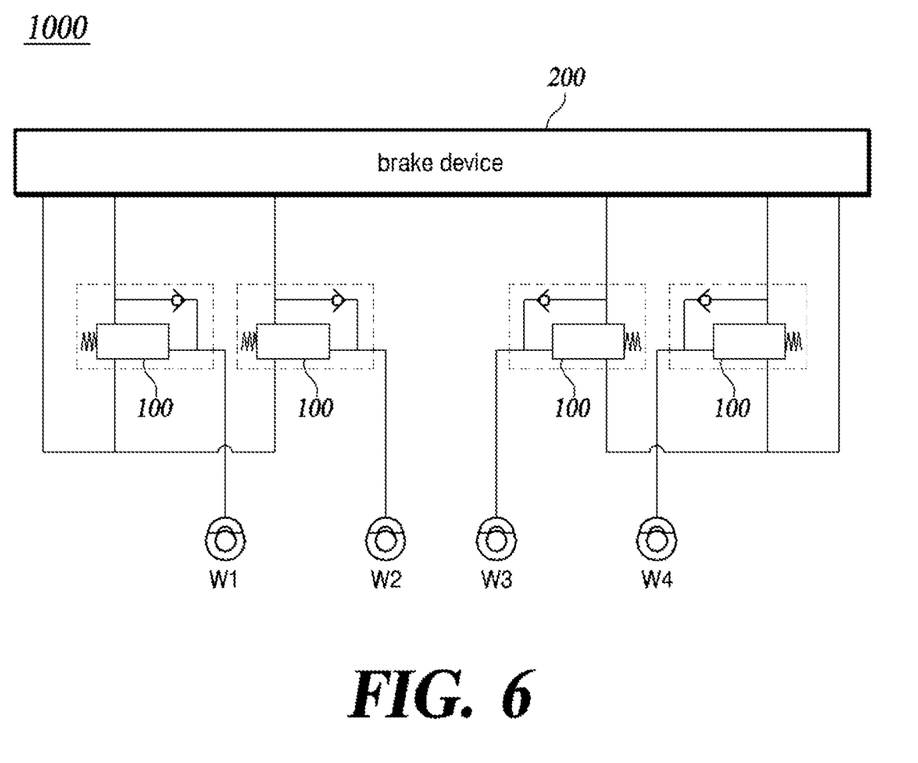
FIG. 6 is a block diagram of a brake system for vehicle including the 3-way solenoid valve according to an embodiment of the present disclosure.

FIG. 6 is a block diagram of a brake system for vehicle including the 3-way solenoid valve according to an embodiment of the present disclosure.

Referring to FIG. 6, a brake system for vehicle 1000 according to an embodiment of the present disclosure includes a brake device 200, one or more 3-way solenoid valves 100, and one or more wheel cylinders W1, W2, W3 and W4. Here, the 3-way solenoid valve 100 is same as described in FIGS. 2 to 5.

Each of the wheel cylinders W1, W2, W3 and W4 are disposed on each wheel of the vehicle to apply braking pressure to each wheel using hydraulic pressure. When hydraulic pressure is supplied to the wheel cylinders W1, W2, W3, and W4, a brake pad disposed on the wheel of the vehicle contacts a wheel disk to generate a friction force, thereby generating braking force.

The brake device 200 is arranged to supply hydraulic pressure to the wheel cylinders W1, W2, W3, and W4 by using a foot force applied to a brake pedal or driving a hydraulic pump. Here, the brake device 200 can supply hydraulic pressure by amplifying foot force applied as the driver depresses a brake pedal, or can supply hydraulic pressure by operating a hydraulic pump as much as the amount of a driver's pedal depression.

Among the configurations of the 3-way solenoid valve 100 described in FIGS. 2 to 5, the orifice 22 protruding and disposed inside the hollow portion of the first armature 20*a* may have a different effective area between the first armature 20*a* and the rod 21 according to the degree of protrusion. For example, in case of a front wheel that requires a relatively large amount of fluid, it is possible to adjust the amount of fluid supplied to each wheel by decreasing the protrusion height of the orifice 22 of the 3-way solenoid valve disposed on the front wheels and increasing the protrusion height of the orifice 22 of the 3-way solenoid valve disposed on the rear wheels.

The block diagram of the vehicle braking system shown in FIG. 6 is exemplary, and is not limited to the configuration and arrangement shown in FIG. 6.

As described above, according to some embodiments of the present disclosure, the brake system for vehicle including the 3-way solenoid valves minimizes the number of valves deployed in the brake system for vehicle by using three-way fluid port and by using sealing part that acts as a check valve, so that manufacturing cost is reduced and the weight and size of the brake system for vehicle is reduced.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above descriptions but by the claims and equivalents thereof.

What is claimed is:

1. A 3-way solenoid valve comprising:
a valve chamber;
a valve block including a first fluid port, a second fluid port, and a third fluid port, each in fluid communication with the valve chamber;
a first operation assembly including a first coil, a first armature configured to generate an electromagnetic force when current is supplied to the first coil and having a hollow portion formed in a center of the first armature, a body arranged on a lower portion of the first armature and formed to allow at least a portion of the first armature to pass through inside of the body, and a first elastic unit arranged between the body and the first armature;
a valve seat arranged to block flow of fluid between the second fluid port and the third fluid port, and having a hollow portion in a center of the valve seat; and
a second operation assembly including a second coil arranged above the first coil, a second armature configured to generate an electromagnetic force when current is supplied to the second coil, a fluid control unit arranged under a hollow portion of the valve seat to control the amount of fluid flowing to the third fluid port, and a rod passing through the valve seat and the first armature while one end of the rod is in contact with the second armature and the other end of the rod is in contact with the fluid control unit,
wherein the 3-way solenoid valve is configured so that when current is not applied to both the first coil and the second coil, a first flow path between the first armature and the valve seat is opened so that fluid passes through the hollow portion of the first armature and the first flow path to flow between the first fluid port and the second fluid port.

2. The 3-way solenoid valve of claim 1, further comprising an orifice protruding inwardly within the hollow portion of the first armature.

3. The 3-way solenoid valve of claim 1, further comprising a sealing unit arranged inside the body and in close contact with an outer peripheral surface of the first armature.

4. The 3-way solenoid valve of claim 3, wherein the sealing unit is configured so that fluid flows only from the first fluid port toward the second fluid port, and fluid does not flow from the second fluid port toward the first fluid port.

5. The 3-way solenoid valve of claim 1, wherein the first armature and the second armature are independently driven by the first coil and the second coil, respectively.

6. The 3-way solenoid valve of claim 1, wherein the 3-way solenoid valve is configured so that when current is applied to the first coil, the first armature moves in a direction toward the body due to an electromagnetic force generated by the first coil, and blocks fluid flowing between the first fluid port and the second fluid port.

7. The 3-way solenoid valve of claim 1, wherein the 3-way solenoid valve is configured so that when current is applied to the first coil and the second coil, the first armature, the second armature, and the body are in close contact with each other due to electromagnetic force, so that a second flow path is opened to flow fluid between the first fluid port and the third fluid port while the first flow path is closed.

8. The 3-way solenoid valve of claim 1, further comprising a second elastic unit arranged under the fluid control unit so that the fluid control unit and the hollow portion of the valve seat are in close contact with each other.

9. The 3-way solenoid valve of claim 1, the 3-way solenoid valve is configured so that the amount of fluid flowing between the first fluid port, the second fluid port, and the third fluid port continuously changes according to the amount of current applied to the first coil and the second coil.

10. A brake system for vehicle comprising:
one or more wheel cylinders configured to apply braking pressure to each wheel of the vehicle using hydraulic pressure;
one or more 3-way solenoid valves configured to be placed to increase or decrease the hydraulic pressure supplied to the one or more wheel cylinders; and
a brake device configured to supply hydraulic pressure to the wheel cylinder by using foot pressure applied to a brake pedal or driving a hydraulic pump,
wherein the 3-way solenoid valve comprises:
a valve chamber;
a valve block including a first fluid port, a second fluid port, and a third fluid port, each in fluid communication with the valve chamber;
a first operation assembly including a first coil, a first armature configured to generate an electromagnetic force when current is supplied to the first coil and having a hollow portion formed in a center of the first armature, a body arranged on a lower portion of the first armature and formed to allow at least a portion of the first armature to pass through inside of the body, and a first elastic unit arranged between the body and the first armature;
a valve seat arranged to block flow of fluid between the second fluid port and the third fluid port, and having a hollow portion in a center of the valve seat; and
a second operation assembly including a second coil arranged above the first coil, a second armature configured to generate an electromagnetic force when current is supplied to the second coil, a fluid control unit arranged under a hollow portion of the valve seat to control the amount of fluid flowing to the third fluid port, and a rod passing through the valve seat and the first armature while one end of the rod is in contact with the second armature and the other end of the rod is in contact with the fluid control unit,
wherein the 3-way solenoid valve is configured so that when current is not applied to both the first coil and the second coil, a first flow path between the first armature and the valve seat is opened so that fluid passes through the hollow portion of the first armature and the first flow path to flow between the first fluid port and the second fluid port.

11. The brake system for vehicle of claim 10, the first armature further comprising an orifice protruding inwardly within the hollow portion of the first armature.

12. The brake system for vehicle of claim 11, wherein the orifice is configured so that an area of a flow path between the first armature and the rod is changed by varying a protruding size of the orifice for each 3-way solenoid valve disposed on each wheel of the vehicle.

13. The brake system for vehicle of claim 10, the 3-way solenoid valve further comprising a sealing unit arranged inside the body and in close contact with an outer peripheral surface of the first armature.

14. The brake system for vehicle of claim 13, wherein the sealing unit is configured so that fluid flows only from the first fluid port toward the second fluid port, and fluid does not flow from the second fluid port toward the first fluid port.

15. The brake system for vehicle of claim 10, wherein the 3-way solenoid valve is configured so that the first armature and the second armature are independently driven by the first coil and the second coil, respectively.

16. The brake system for vehicle of claim 10, wherein the 3-way solenoid valve is configured so that when current is applied to the first coil, the first armature moves in a direction toward the body due to an electromagnetic force generated by the first coil, and blocks fluid flowing between the first fluid port and the second fluid port.

17. The brake system for vehicle of claim 10, wherein the 3-way solenoid valve is configured so that when current is applied to the first coil and the second coil, the first armature, the second armature, and the body are in close contact with each other due to electromagnetic force, so that a second flow path is opened to flow fluid between the first fluid port and the third fluid port while the first flow path is closed.

18. The brake system for vehicle of claim 10, wherein the 3-way solenoid is configured so that the amount of fluid flowing between the first fluid port, the second fluid port, and the third fluid port continuously changes according to the amount of current applied to the first coil and the second coil.

19. A 3-way solenoid valve comprising:
a valve chamber;
a valve block including a first fluid port, a second fluid port, and a third fluid port, each in fluid communication with the valve chamber;
a first operation assembly including a first coil, a first armature configured to generate an electromagnetic force when current is supplied to the first coil and having a hollow portion formed in a center of the first armature, a body arranged on a lower portion of the first armature and formed to allow at least a portion of the first armature to pass through inside of the body, and a first elastic unit arranged between the body and the first armature;
a valve seat arranged to block flow of fluid between the second fluid port and the third fluid port, and having a hollow portion in a center of the valve seat;
a second operation assembly including a second coil arranged above the first coil, a second armature configured to generate an electromagnetic force when current is supplied to the second coil, a fluid control unit arranged under a hollow portion of the valve seat to control the amount of fluid flowing to the third fluid port, and a rod passing through the valve seat and the first armature while one end of the rod is in contact with the second armature and the other end of the rod is in contact with the fluid control unit; and
an orifice protruding inwardly within the hollow portion of the first armature.

\* \* \* \* \*